Aug. 12, 1958
A. GLASSANOS
2,847,650
SPLIT COLLAR INSULATION FOR STATIONARY
ELECTRICAL INDUCTION APPARATUS
Filed April 4, 1956
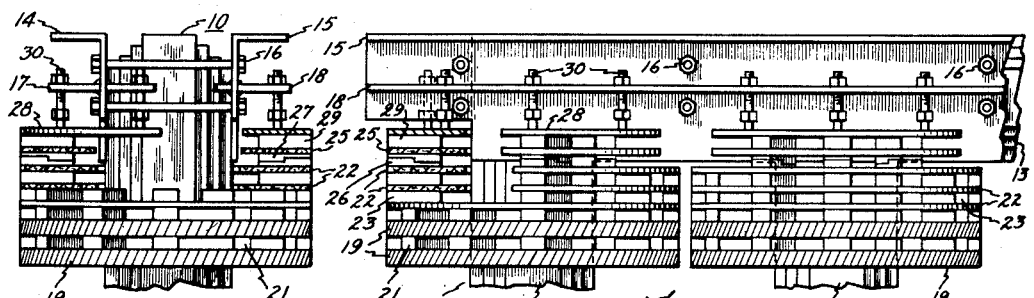
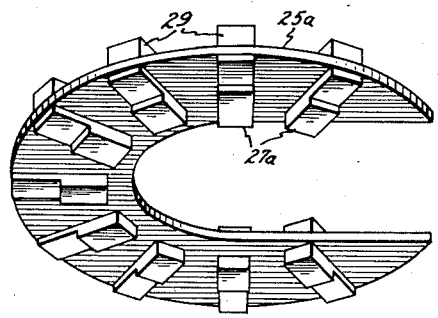
Fig. 3.
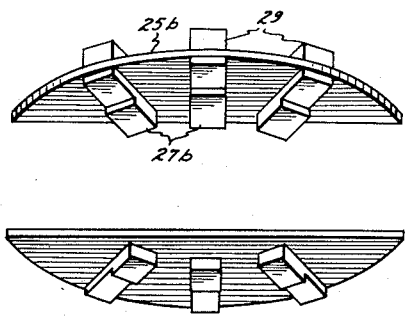
Fig. 4.
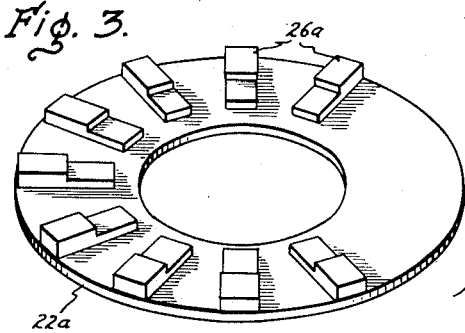
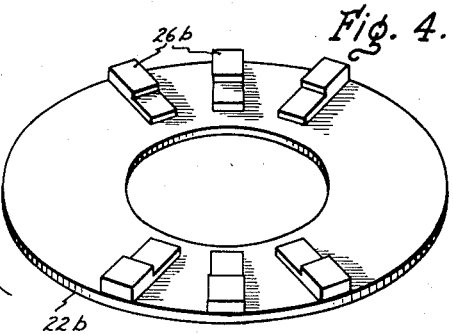
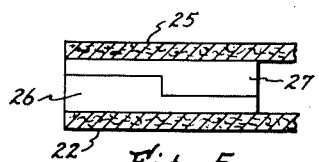
Fig. 5.
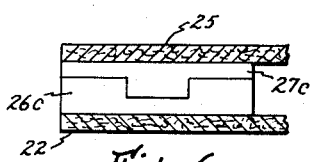
Fig. 6.
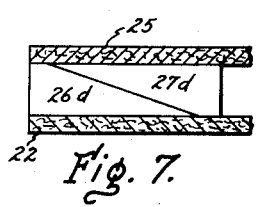
Fig. 7.
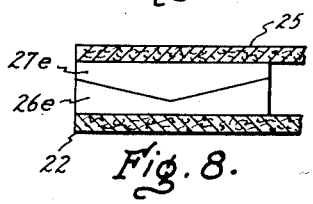
Fig. 8.
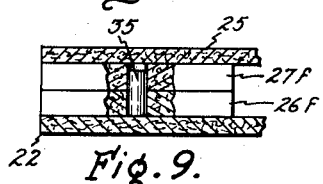
Fig. 9.
Inventor
Andrew Glassanos,
by Gilbert P Tarleton
His Attorney.

United States Patent Office 2,847,650
Patented Aug. 12, 1958

2,847,650

SPLIT COLLAR INSULATION FOR STATIONARY ELECTRICAL INDUCTION APPARATUS

Andrew Glassanos, Pittsfield, Mass., assignor to General Electric Company, a corporation of New York Application April 4, 1956, Serial No. 576,118

10 Claims. (Cl. 336—197)

This invention relates to stationary electrical induction apparatus, and more in particular to improved means for holding split collar insulation in place in stationary electrical induction apparatus such as power transformers and the like.

Power transformers are frequently comprised of a plurality of parallel leg members of magnetic material joined at their respective ends by a pair of yoke members of magnetic material. Windings are provided on the leg members, and one type of such winding is comprised of a plurality of axially spaced apart disk shaped coils. In order to prevent axial displacement of the windings, a plurality of annular disk shaped insulation members may be provided at each end of each winding, the insulation members being axially spaced apart from each other and from the windings by radially extending insulators. Adjustable clamping means are rigidly affixed to the structure of the yoke members, the clamping means being separated from the annular insulating members by axially spaced apart split collar means.

As an example of the typical construction, rigid plates may be provided on either side of the yoke structure extending longitudinally of the yoke structure in a plane perpendicular to the axis of the leg members. Adjustable bolts are provided in the rigid plates, and clamping force is transmitted from the bolts to the annular insulation members by a plurality of split collars, the collars being axially spaced apart by radial extending insulation members. The collars are split since these collars are beyond the ends of the leg members, and therefore the presence of the yoke structure joining the ends of the leg members prevents the use of annular insulation members. The split collars for the outermost windings of the transformer may be horseshoe shaped, while the windings for inner legs of the transformer are provided with split collars that are segments of a circle.

Since all of the axial clamping force on the windings is transmitted through the split collars, means must be provided for holding the split collars in alignment with the respective windings. In the past, various means have been employed for holding the collars in place. In one such means, extensions are provided on the split collars of adjacent windings, and these extensions are bolted together with fiber studs. In another means for holding the split collars in place, radial extensions are provided on the split collars and their adjacent annular insulating members of the same winding, and these extensions are bolted together with fiber studs. In still another holding means, the radially extending spacers of the split collars and their adjacent annular insulating members are provided with radial extensions beyond the outer extremities of the windings, the extensions being held together by string wrapped therearound. In still another holding means, bolts are provided to hold metallic coil support plates at the axial extremities of the winding structure to adjacent radially extending spacers of the split collars.

While the aforestated means for holding the split collars in place adequately serve their function, the necessity of providing radial extensions on the collars greatly increases their cost, as does the necessity for bolting or otherwise holding the collars in place.

It is therefore an object of this invention to provide an improved means for holding split collars of stationary electrical induction apparatus.

It is also an object to provide means for holding the split collars of stationary electrical induction apparatus such as transformers or the like, the holding means requiring no bolts or similar fastening devices, and also requiring no lugs or other radial extensions on the collars.

Briefly stated, in accordance with one embodiment of my invention, the split or horseshoe collars of a transformer are provided on their faces with axially extending spacers. The adjacent annular disc shaped insulating members of the transformer also have radially extending spacers, the spacers of the split collars and annular insulating members being disposed in axial alignment. The outer radial extremity of the spacers of the split collars are relieved, and the inner radial extremities of the spacers of the annular insulating means are relieved, so that the unrelieved portions of the spacers are radially overlapped (i. e., a plane perpendicular to the axis of the winding passes through the unrelieved portions of the radially extending spacers of the split collar and the adjacent annular insulating member).

While the specification concludes with claims particularly pointing out and distinctly claiming the subject matter which I regard as my invention, it is believed that the invention will be better understood from the following description taken in connection with the accompanying drawing, in which:

Fig. 1 is a partially cross-sectional view of a portion of the end of a transformer having split collars according to my invention, Fig. 2 is a side view of the transformer of Fig. 1, Fig. 3 is an enlarged perspective exploded view of the split collar and adjacent annular insulating member of an end leg of the transformer of Figs. 1 and 2, Fig. 4 is an enlarged perspective exploded view of the split collar and adjacent annular insulating means of a center leg of the transformer of Fig. 2, Fig. 5 is an enlarged cross-sectional view of the holding means according to my invention as illustrated in Figs. 1 through 4, and Figs. 6, 7, 8 and 9 illustrate modifications of the cross-sectional view of Fig. 5.

Referring now to the drawing, and more particularly to Figs. 1 and 2 therein is illustrated a portion of a transformer having split collars in accordance with my invention. The transformer has a core 10 of magnetic material. The core 10 is comprised of a plurality of parallel spaced apart leg members 11 and 12 joined at their respective ends by a pair of yoke members (only the yoke member 13 being illustrated in the drawing). In the drawing of Fig. 2, for sake of clarity, only the upper portion of an outside leg 11 and the upper portion of an inside leg 12 are shown. The upper yoke member 13 joins the ends of leg members 11 and 12 and also other leg members (not illustrated) if desired. Angle members 14 and 15 are bolted to the yoke 13 by bolts 16 extending through the yoke member 13. The angle members 14 and 15 extend longitudinally of the yoke member 13, and rigid plate members 17 and 18 are welded to the sides of the angle members 14 and 15 respectively, the rigid plates extending longitudinally of the angle members 14 and 15 in a plane perpendicular to the axes of the core leg members 11 and 12.

Windings 19, each comprised of a plurality of disk shaped coils, are provided on the leg members 11 and 12, and are spaced apart by radially extending spacers 21. A plurality of annular disc shaped insulating members 22 are provided adjacent to the ends of the windings 19 and coaxial therewith. The annular insulating members are axially spaced apart from each other and from the ends of the windings by radially extending spacers 23.

In order to provide axial clamping force on the windings, split insulating collars 25 are provided adjacent to the endmost annular insulating means 22. The split collars 25 are axially spaced apart from the endmost annular insulating members 22 by radially extending spacing members 26 affixed to the insulating means 22, and radially extending spacing members 27 affixed to the split collars 25. The radially extending spacing means 26 and 27 are disposed in axial alignment. A metallic split collar clamping plate 28 is axially spaced from the split collars 25 by radially extending spacers 29, and a plurality of studs 30 extend through the support member 18 to provide an adjustable axial force against the clamping plate 28.

Stated in another manner, axial clamping force on the windings 19 is transmitted to the windings from the rigid plate 18 of the yoke structure by means of adjustable studs 30 which extend through the plate 18 to split collar clamping plates 28, thence through the split insulating collars 25 and their associated radially extending spacers 27 and 29, and thence through the annular insulating members 22 and their associated radially extending means 23 and 26 to the axially endmost coils of the windings 19. As may be seen in Figs. 1 and 2, the split collars are employed in order to provide sufficient insulation between the clamping means and the windings in the region where the innermost extremities of the yoke members 13 prevent the use of annular insulating collars.

Referring now to Fig. 3, therein is illustrated an exploded view of the split collar 25a of an end leg of the transformer of Figs. 1 and 2, and the adjacent annular insulating member 22a. In Fig 3 it is shown that the split collar for the end leg is horseshoe shaped for fitting around the end of the magnetic core yoke. A plurality of axially extending spacers 27a are provided on the side of the split collar 25a facing the annular insulating member 22a and a plurality of radially extending spacers 26a axially aligned with the spacers 27a are provided on the face of the annular insulating member 22 facing the split collar 25a. As illustrated in Fig. 3, the radially outermost half of the radially extending spacers 27a of split collar 25a are axially relieved, and the radially innermost half of the radially extending spacers 26a of annular insulating member 22a are axially relieved.

Referring now to Fig. 4, therein is illustrated an exploded view of the split insulating collar 25b and next adjacent annular insulating member 22b of a central leg of the transformer of Fig. 2. The collar 25b and annular member 22b are provided with radially extending spacers 27b and 26b respectively as in the split collar and annular insulating means of Fig. 3, and the radially extending spacers 26b and 27b are relieved in the manner previously disclosed in reference to Fig. 3. The split collar 25b for the central winding, as illustrated in Fig. 4, is in the shape of a pair of segments of a circle.

The joint between the radially extending spacers 26 and 27 is more clearly illustrated in Fig. 5. In this figure it is shown that the unrelieved half of the radially extending spacer 26 extends into the relieved half of the radially extending spacer 27, and similarly the unrelieved half of the spacer 27 fits into the relieved half of the spacer 26, thereby providing radial overlapping between the adjacent spacers, that is, at least a portion of each of the radially extending spacers 26 and 27 intersect the same plane normal to the axes of the legs of the transformer. Thus the radially extending spacers 26 and 27 are radially interlocked to prevent displacement of the split collars. In this figure the radially outermost edges of the collar, annular insulating member, and spacers are on the left side of the drawing.

Figs. 6, 7, 8 and 9 illustrate other means for providing the interlocking of the radial spacers. In Fig. 6, the radially extending spacer 26c of annular insulating member 22 is centrally axially relieved, and an axial extension of radially extending spacer 27c of the split collar 25 axially extends into the relieved portion of the spacer 26. In Fig. 7, the radially extending spacers 26d and 27d are right-triangular shaped, with their hypotenuse sides in contacting relationship, the radially extending spacer 27d of split collar 25 lying radially inwardly of the radially extending spacer 26d of the annular insulating member 22. In the modification of Fig. 8, which is similar to the modification of Fig. 6, the division line between the radially extending spacers 26e and 27e is V-shaped. In the modification of Fig. 9, a pin 35, axially extending from the radially extending spacer 26f, projects into a recess in the radially extending spacer 27f.

Although the drawing has illustrated only the use of the interlocking means of my invention in connection with the upper split collars of the apparatus, it will be obvious that the same means may be employed also on the lower split collars. It will also be obvious that many other embodiments of my invention may be provided wherein displacement of the split collars is prevented by radial overlapping of portions of the radially extending spacers of the split collars and their adjacent annular insulating members.

It will be understood, of course, that, while the forms of my invention herein shown and described constitute preferred embodiments of my invention, it is not intended herein to illustrate all of the possible equivalent forms or ramifications thereof. It will also be understood that the words used are words of description rather than of limitation, and that various changes may be made without departing from the spirit or scope of the invention therein disclosed, and it is aimed in the appended claims to cover all such changes as fall within the true spirit and scope of the invention.

What I claim as new and desire to secure by Letters Patent of the United States is:

1. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing displacement of said split collar insulating means with respect to said disk shaped insulating means comprising a first portion of each of said radially extending spacing means rigidly affixed to said split collar means and a second portion of each of said radially extending spacing means being rigidly affixed to said disk shaped means, at least a part of respective said first and second portions being radially overlapped.

2. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing displacement of said split collar insulating means with respect to said disk shaped insulating means comprising a first portion of each of said radially extending spacing means rigidly affixed to said split collar means, a second portion of each of said radially extending spacing means being rigidly affixed to said disk shaped insulating means, at least a portion of each of the respective portions of each of said radially extending spacing means intersecting a plane normal to the axis of said one leg.

3. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing displacement of said split collar insulating means with respect to said disk shaped insulating means comprising a first portion of each of said radially extending spacing means being rigidly affixed to said split collar means, a second portion of each of said radially extending spacing means being rigidly affixed to said disk shaped insulating means, one radial extremity of the first portion being relieved and the other radial extremity of the second portion being relieved in each of said radially extending spacing means so that said portions interlock.

4. The arrangement of claim 3 in which the radially outermost extremity of said first portion and the radially innermost extremity of said second portion of said radially extneding spacing means are relieved.

5. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing dsiplacement of said split collar insulating means with respect to said disk shaped insulating means comprising a first portion of each of said radially extending spacing means rigidly affixed to said split collar means, and a second portion of each of said radially extending spacing means being rigidly affixed to said disk shaped means one of said portions of each of said radially extending spacing means having a groove into which an extension of the other portion of said radially extending spacing means extends.

6. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing displacement of said split collar insulating means with respect to said disk shaped insulating means comprising a first portion of each of said radially extending spacing means rigidly affixed to said split collar means, and a second portion of each of said radially extending spacing means being rigidly affixed to said disk shaped means, said first and second portions being substantially right triangle shaped with their hypotenuse sides in contacting relationship.

7. The arrangement of claim 6 in which one side of said first portion lies radially inwardly of the respective side of said second portion.

8. In a stationary electrical induction apparatus of the type comprising a plurality of leg members of magnetic material joined at their respective ends by a pair of yoke members of magnetic material, having electrical windings on at least one of said legs with annular disk shaped insulating means at the ends of said windings and having split collar insulating means adjacent said disk shaped means for transmitting axial clamping forces to said winding from coil clamp means, said split collar means and disk shaped insulating means being axially separated by radially extending spacing means, means for preventing displacement of said split collar insulating means with respect to said disk shaped insulating means comprising a first portion of each of said radially extending spacing means rigidly affixed to said split collar means, and a second portion of each of said radially extending spacing means being rigidly affixed to said disk shaped means, one portion of each of said radially extending spacing means having a projection that extends axially into a recess in the other portion of said radially extending spacing means.

9. The arrangement of claim 8 in which said projection is dowel shaped.

10. A stationary electrical induction apparatus comprising a plurality of leg members of magnetic material and joined at their respective ends by a pair of yoke members of magnetic material, an electrical winding on at least one of said legs, annular insulating disk means at the ends of said winding and surrounding said one leg, insulation split collar spacing means adjacent said disk means, the planes of said split collar means passing through said yoke members, said disk means and collar means being axially separated by first radially extending spacing means on said disk means and second radially extending spacing means on said collar means, each of said second extending spacing means being in the same radial plane as one of said first extending spacing means, each pair of said first and second extending spacing means being radially overlapped, with a portion of said second extending spacing means radially contacting a portion of said first extending spacing means disposed radially outwardly of said portion of said second extending spacing means to prevent relative radial movement therebetween.

References Cited in the file of this patent

UNITED STATES PATENTS

| | | |
|---|---|---|
| 1,535,859 | Roothaan | Apr. 28, 1925 |
| 2,654,142 | Horelick | Oct. 6, 1953 |
| 2,756,397 | Cederstrom | July 24, 1956 |